(12) United States Patent
Kobayashi

(10) Patent No.: US 6,793,604 B2
(45) Date of Patent: Sep. 21, 2004

(54) AUTOMATIC TRANSMISSION

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/151,859

(22) Filed: May 22, 2002

(65) Prior Publication Data

US 2002/0177502 A1 Nov. 28, 2002

(30) Foreign Application Priority Data

May 23, 2001 (JP) ........................................ 2001-154269

(51) Int. Cl.⁷ .......................... F16H 48/00; F16H 59/00
(52) U.S. Cl. ........................................ 475/220; 74/335
(58) Field of Search .......................... 475/220; 74/339, 74/335; 180/374

(56) References Cited

U.S. PATENT DOCUMENTS

| | | | |
|---|---|---|---|
| 3,318,168 A | | 5/1967 | De Coye De Castelet |
| 4,241,621 A | * | 12/1980 | Kodama ................... 475/200 |
| 4,616,521 A | * | 10/1986 | Akashi et al. ............... 74/335 |
| 4,727,954 A | * | 3/1988 | Matsumoto ................ 180/249 |
| 4,744,437 A | * | 5/1988 | Matsumoto ................ 180/249 |
| 4,974,473 A | * | 12/1990 | Hatakeyama ............... 74/360 |
| 5,041,068 A | * | 8/1991 | Kobayashi ................. 475/221 |
| 5,445,042 A | * | 8/1995 | Deady ........................ 74/335 |
| 5,761,961 A | * | 6/1998 | Krauss et al. .............. 74/331 |
| 5,906,557 A | * | 5/1999 | Kobayashi ................. 180/249 |
| 6,343,520 B1 | * | 2/2002 | Ohashi et al. .............. 74/335 |
| 6,544,142 B2 | * | 4/2003 | Kobayashi ................. 477/54 |

FOREIGN PATENT DOCUMENTS

| | | | |
|---|---|---|---|
| DE | 198 59 458 A 1 | 6/1999 | |
| EP | 0 780 596 A2 | 6/1997 | |
| EP | 1 096 172 A2 | 5/2001 | |
| FR | 1 003 128 A | 3/1952 | |
| GB | 2348255 A | * 9/2000 | ............ B60K/6/02 |
| JP | 7-167257 | 7/1995 | |
| JP | 2000-65199 | 3/2000 | |

* cited by examiner

Primary Examiner—Charles A Marmor
Assistant Examiner—Dennis Abdelnour
(74) Attorney, Agent, or Firm—McGinn & Gibb, PLLC

(57) ABSTRACT

In an longitudinal type automatic transmission having an input shaft having driving gears, an output shaft having driven gears that are engaged with the driving gears to constitute transmission gear trains, and changeover mechanisms for selecting into a transmission gear train for transmitting a power, the automatic transmission is constructed to have the input shaft, the output shaft, and a driving shaft coupled to a final reduction gear, and has a bypass clutch that is arranged over the final reduction gear to transmit a torque to the output shaft while executing the control in a shifting operation and a start clutch for coupling or decoupling an engine and the input shaft. An oil pump for driving the start clutch and the bypass clutch is arranged over the final reduction gear and near the bypass clutch.

21 Claims, 5 Drawing Sheets

AUTOMATIC TRANSMISSION

BACKGROUND OF THE INVENTION

The present invention relates to an automatic transmission for a vehicle and, more particularly, an automatic transmission installed longitudinally in the engine room on the basis of the mechanism of the manual transmission.

In case the power unit containing the transmission is arranged longitudinally in the engine room, i.e., in case the power unit is arranged such that the input shaft and the output shaft of the transmission are directed in parallel with the running direction of the vehicle, such power unit is arranged as disclosed in Japanese Patent Application Laid-open No. Hei 7-167257, for example. The power unit disclosed in this Publication is prepared for the four-wheel-drive vehicle. The engine, the clutch housing into which the clutch is incorporated, the transmission main body into which the final reduction gear for driving the front wheel is incorporated, and the transfer unit having the power transfer mechanism of the front and rear wheels are arranged in the engine room in this order from the front side of the vehicle. The power is transmitted from the rear end portion of the transmission to the driving unit that transmits the power to the rear wheel.

The transmission disclosed in this Publication is the manual transmission (MT). The selecting operation of the transmission gear train which transmits the power, out of plural transmission gear trains provided between the input shaft and the output shaft, is executed manually by the operator operating the shift lever. The selecting operation is carried out automatically by the hydraulic actuator in response to the running situation of the vehicle on the basis of the mechanism of such manual transmission. The Automated Manual Transmission (AMT) can be completed as disclosed in Japanese Patent Application Laid-open No. Toku-Kai 2000-65199, for example. In this automatic transmission, the shift clutch, i.e., the bypass clutch is provided to transmit the torque of the input shaft to the output shaft in synchronism with controls of the start clutch and the electronic throttle valve when the transmission gear train is switched by the changeover mechanism that consists of the synchronizer. This bypass clutch is fitted to the gear train at the highest shifting stage. Since the generation of the torque stop during the shifting operation is prevented, the shift shock can be reduced and thus the smooth shifting operation can be carried out.

In this automatic transmission, the bypass clutch is fitted to the highest shifting stage of the parallel two-axle transmission gear train such that the torque of the input shaft is transmitted from the highest shifting stage to the output shaft during the shifting operation. In this case, the bypass clutch consisting of the multiple disc clutch must be provided between the transmission gear train at the highest shifting stage constructed at the rear end portion of the main transmission portion, and the transfer unit from the viewpoint of the space. For this reason, following subjects and disadvantages are caused.

In case the bypass clutch is fitted to the drive train in which the transmission having the transfer unit at its rear end portion and the engine are arranged longitudinally in the engine room, length of the transmission is increased by the thickness dimension of the added bypass clutch. Since the transmission is extended in its axial direction, the rear end portion of the transmission becomes close to tunnel members of the carbody structure and the toe board. Therefore, since the carbody structure is designed with regard to the crash stroke in the crash, the carbody structure must be corrected to reduce the interior space. Also, the expansion of the transmission lowers the flexural rigidity of the transmission itself and thus the vibration and the noise of the drive train become worse. In addition, if either the manual transmission or the automatic transmission is installed into the vehicle having the same carbody structure, there is a possibility that the compatibility of the carbody structure is lost because their outer dimensions of the transmissions are different.

This automatic transmission has the start clutch, the bypass clutch, the oil pump, and the hydraulic control mechanism. It is desired that these elements should be assembled closely by employing the hydraulic circuit that is able to arrange the start clutch and the bypass clutch around the oil pump as close as possible, or reducing the hydraulic circuit extended from the hydraulic control mechanism. However, in the automatic transmission disclosed in Japanese Patent Application-Laid-open No. Toku-kai 2000-65199, there is disclosed such a structure that the start clutch is provided in front of the transmission and also the bypass clutch is provided at the back of the transmission. Thus, the control hydraulic pressure is guided from the hydraulic control mechanism to the hydraulic chambers of respective clutches via the hydraulic circuits. As a result, when respective clutches are controlled by the hydraulic control mechanism arranged normally under the transmission, it is possible to worsen the responsibility because the hydraulic circuits are long. In particular, when the atmospheric temperature is low, such influence is ready to appear. In this manner, the functional disadvantages may be caused in the minute control of the start clutch to attain the smooth start, the momentary control of the hydraulic pressure of the bypass clutch during the shifting operation to get the smooth shifting operation, etc.

SUMMARY OF THE INVENTION

It is an object of the present invention to provide an Automated Manual Transmission (AMT) constructed based on the structure of the manual transmission, which is capable of preventing the increase of the transmission in size in the axial direction and also improving the responsibility at the time of hydraulic control.

An automatic transmission of the present invention comprising: an input shaft to which a plurality of driving gears are provided; an output shaft to which a plurality of driven gears are provided, the plurality of driven gears being engaged with the driving gears to constitute a plurality of transmission gear trains respectively; a changeover mechanism for selecting the desired transmission gear train which transmits a power, out of the plurality of transmission gear trains; a start clutch for setting an engine and the input shaft into an engage state and a disengage state; a driving shaft coupled to the output shaft in parallel with the output shaft, the driving shaft being coupled to a final reduction gear; and a bypass clutch arranged over the final reduction gear and transmitting a torque of the input shaft to the output shaft while controlling connection and disconnection in synchronism with a selecting operation of the transmission gear trains in a shifting operation, wherein the manual transmission is arranged longitudinally in an engine room in which the input shaft and the output shaft are arranged in a traveling direction of a vehicle.

In the automatic transmission of the present invention, the bypass clutch comprises a plurality of bypass clutches provided between the input shaft and the output shaft, wherein at least one of the plurality of bypass clutches is arranged over the final reduction gear, and the driving shaft is arranged below the output shaft.

In the automatic transmission of the present invention, the automatic transmission further comprises an oil pump driven by the engine to generate a hydraulic pressure which drives the start clutch and the bypass clutch, wherein the oil pump is arranged over the final reduction gear and near the bypass clutch.

The automatic transmission having the final reduction gear is constructed to have three rotation shafts, and also the bypass clutch is installed over the final reduction gear. Therefore, an upper space of the final reduction gear can be effectively employed, and also the automatic transmission can be shortened in the axial direction.

Since the oil pump can be arranged over the final reduction gear and near the bypass clutch, the upper space of the final reduction gear can be effectively employed and thus the hydraulic pressure source and the hydraulic actuator can be positioned closely. Therefore, the automatic transmission can be shortened in the axial direction and thus the responsibility in the hydraulic pressure control can be improved.

DETAILED DESCRIPTION OF THE PREFERRED EMBODIMENTS

Embodiments of the present invention will be explained in detail with reference to the drawings hereinafter.

Figure 1:
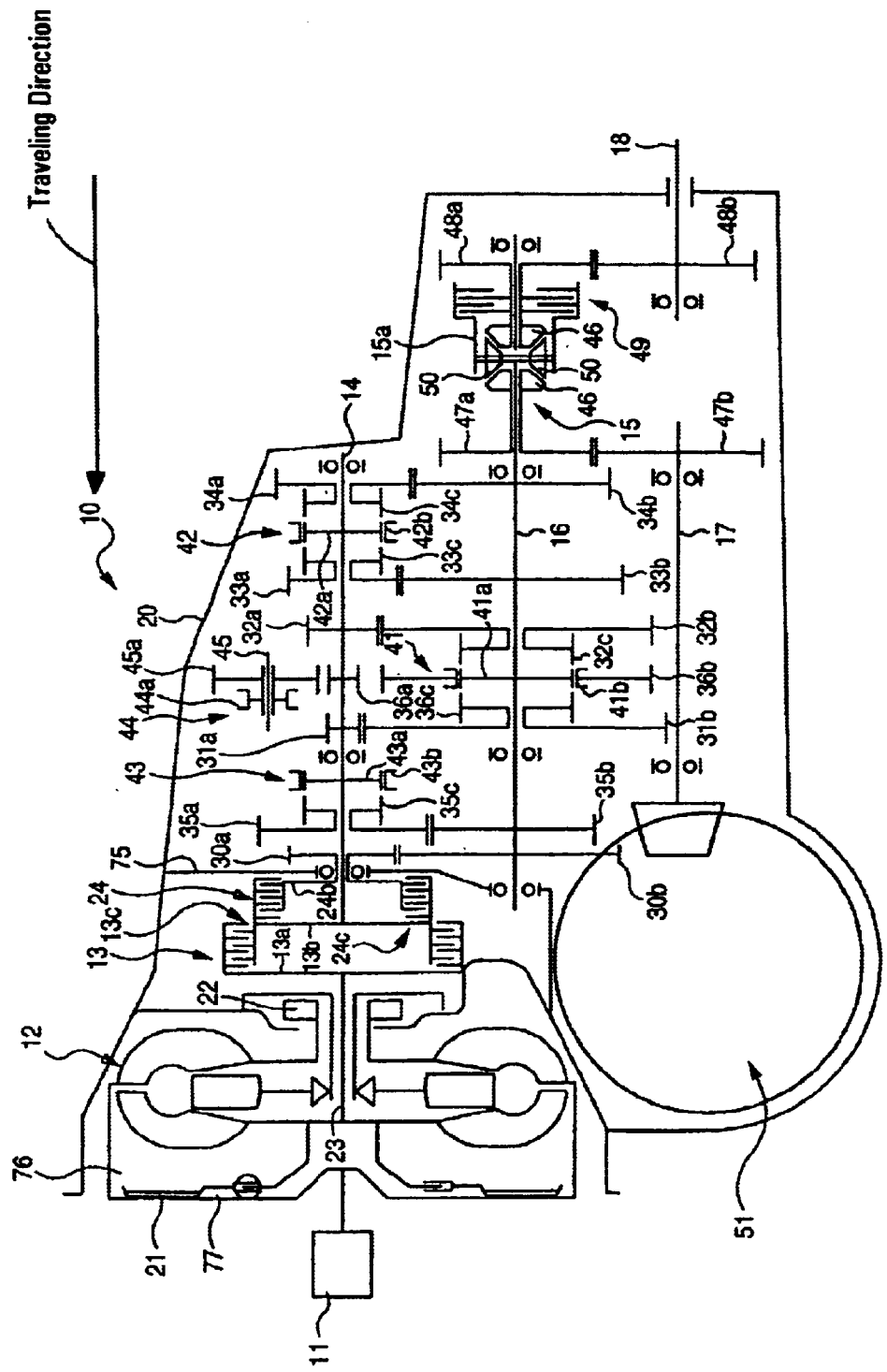
FIG. 1 is a skeleton diagram showing an automatic transmission as an embodiment of the present invention.

FIG. 1 is a skeleton diagram showing an automatic transmission 10 as an embodiment of the present invention. As shown in FIG. 1, this automatic transmission 10 is coupled to an engine 11, and comprises an input shaft 14 coupled to the engine 11 via a torque converter 12 and a start clutch 13, an output shaft 16 positioned in parallel with the input shaft 14 and coupled to a center differential gear 15, and a front wheel driving shaft 17 and a rear wheel driving shaft 18 positioned in parallel with the input shaft 14 and coupled to the output shaft 16 via the center differential gear 15. One end portion of the rear wheel driving shaft 18, the input shaft 14, the output shaft 16, and the front wheel driving shaft 17 are incorporated into a case 20 to direct to the traveling direction of the vehicle. This automatic transmission 10 is applied to the four-wheel-drive vehicle in which such transmission is arranged longitudinally.

The torque converter 12 having a lock-up clutch 21 is coupled to the engine 11. An oil pump 22 is coupled to the torque converter 12, and thus the oil pump 22 is driven by the engine 11. The start clutch 13 and a bypass clutch 24 are provided between a turbine shaft 23 which transmits the output of the torque converter 12, and the input shaft 14. This start clutch 13 switches the engage state in which the turbine shaft 23 is connected to the input shaft 14 and the disengage state in which the turbine shaft 23 is disconnected from the input shaft 14. This bypass clutch 24 transmits the drive torque of the input shaft 14 to the output shaft 16 while controlling it.

An electronic throttle for adjusting the engine torque and the engine speed is provided to the engine 11. Normally the electronic throttle is opened/closed by the output signal which is output from the electronic device in response to an amount of pushing-down of an acceleration pedal (not shown), so that the engine control is carried out. Also, irrespective of the pushing-down of the acceleration pedal, the electronic throttle can be opened/closed based on the map set previously according to the sensed driving state, so that the engine control can be carried out.

A start clutch drum 13a is fixed to the end portion of the turbine shaft 23, and a start clutch hub 13b is fixed to the end portion of the input shaft 14. Plural sheets of start clutch plates 13c are provided between the start clutch hub 13b and the start clutch drum 13a. The start clutch hub 13b and the start clutch drum 13a can be coupled by pushing the start clutch plates 13c, so that the power of the turbine shaft 23 can be transmitted to the input shaft 14.

A bypass clutch hub 24b is fitted rotatably to the input shaft 14. Plural sheets of bypass clutch plates 24c are provided between the start clutch hub 13b, which is fixed to the end portion of the input shaft 14, and the bypass clutch hub 24b. Thus, the bypass clutch hub 24b and the start clutch hub 13b can be coupled by pushing the bypass clutch plates 24c. The start clutch hub 13b also functions as a bypass clutch drum.

A bypass driving gear 30a is fixed to the bypass clutch hub 24b that is provided rotatably to the input shaft 14, and a bypass driven gear 30b is fixed to the output shaft 16. The bypass driving gear 30a and the bypass driven gear 30b are engaged mutually, and constitute the driving torque transmitting gear train to transmit the driving torque of the input shaft 14 the output shaft 16 when the bypass clutch 24 is coupled.

Driving gears 31a, 32a as the first and second gears are fixed to the input shaft 14, and also driving gears 33a to 35a as the third to fifth gears are provided rotatably to the input shaft 14. Driven gears 31b, 32b as the first and second gears are provided rotatably to the output shaft 16, and also driven gears 33b to 35b as the third to fifth gears are fixed to the output shaft 16. The driving gears 31a to 35a and the driven gears 31b to 35b are engaged respectively to constitute the forward transmission gear train.

A first changeover mechanism 41 for selecting the transmission gear train into one of the first gear and the second gear is mounted onto the output shaft 16, and a second changeover mechanism 42 for selecting the transmission gear train into one of the third gear and the fourth gear is mounted onto the input shaft 14. Also, a third changeover mechanism 43 for selecting the transmission gear train into the fifth gear is mounted onto the input shaft 14. The changeover mechanisms 41 to 43 are constructed as the synchromesh mechanisms in which synchro sleeves 41b to 43b provided slidably to synchro hubs 41a to 43a, are engaged synchronously with splines 31c to 35c provided integrally with gears 31b, 32b, 33a to 35a, respectively. The driving torque of the input shaft 14 can be transmitted to the output shaft 16 via the selected transmission gear train by operating respective changeover mechanisms 41 to 43.

A reverse driving gear 36a is fixed to the input shaft 14, and a reverse driven gear 36b is fixed to the synchro sleeve 41b that is coupled to the output shaft 16. An idler gear 45a is mounted rotatably onto an idler shaft 45 that is arranged in parallel with the input shaft 14. A fourth changeover mechanism 44 for selecting the transmission gear train to the backward drive is provided to the idler gear 45a. The idler gear 45a can be slid in the axial direction by operating a changeover member 44a that is mounted onto this fourth changeover mechanism 44. The reverse driving gear 36a and the reverse driven gear 36b can be engaged with each other via the idler gear 45a by sliding the idler gear 45a. In this manner, the fourth changeover mechanism 44 is the slide-selection type changeover mechanism. The driving torque of the input shaft 14 can be transmitted to the output shaft 16 by operating this fourth changeover mechanism 44 after its rotating direction is reversed.

A front wheel driving gear 47a and a rear wheel driving gear 48a are fixed to two bevel gears 46 of the center differential gear 15, which is a differential unit provided to the end portion of the output shaft 16, respectively. A front wheel driven gear 47b is provided integrally to the front wheel driving shaft 17. When the front wheel driven gear 47b is engaged with the front wheel driving gear 47a, the driving torque of the output shaft 16 can be transmitted to the front wheel driving shaft 17 via the center differential gear 15. Similarly, a rear wheel driven gear 48b is provided to the rear wheel driving shaft 18. When the rear wheel driving gear 48a is engaged with the rear wheel driven gear 48b, the driving torque of the output shaft 16 can be transmitted to the rear wheel driving shaft 18 via the center differential gear 15.

Also, a friction clutch 49 that couples a diff-case 15a which is coupled to the output shaft 16, to the bevel gears 46 or decouples the diff-case 15a from the bevel gears 46 is installed into the center differential gear 15. When this friction clutch 49 is brought into the coupled state, the bevel gears 46 are engaged with bevel pinions 50. Therefore, a differential function of the center differential gear 15 does not operate, and thus the driving torque of the output shaft 16 can be transmitted to two driving shafts 17, 18 as it is.

The front wheel driving shaft 17 is coupled to a front wheel drive shaft (not shown) via a front differential gear 51. Also, the rear wheel driving shaft 18 is coupled to a rear wheel drive shaft (not shown) via a rear differential gear (not shown).

Figure 2:
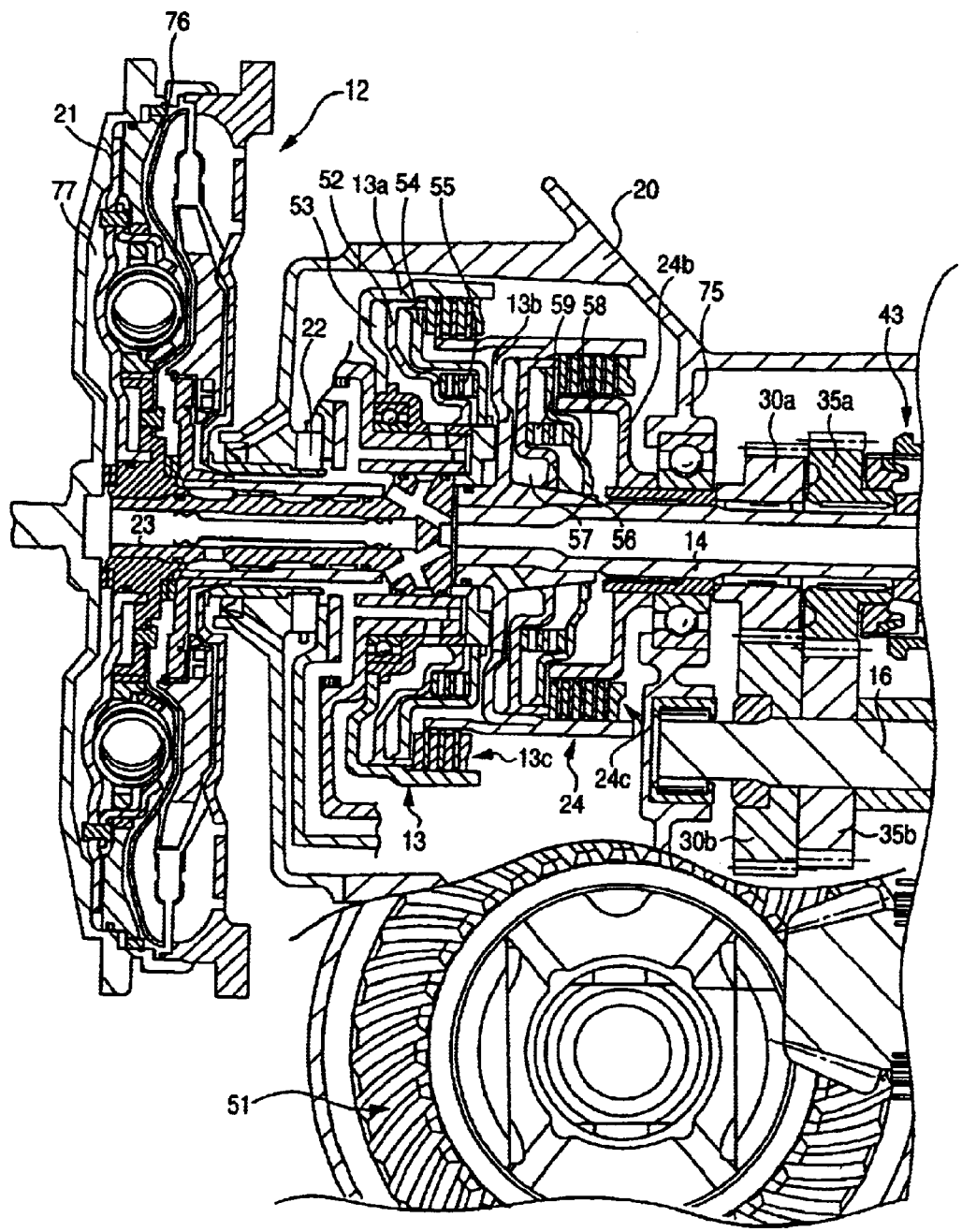
FIG. 2 is a sectional view showing a part of the automatic transmission shown in FIG. 1.

FIG. 2 is a sectional view showing a part of the automatic transmission 10. As shown in FIG. 1 and FIG. 2, the oil pump 22, the start clutch 13, and the bypass clutch 24 are arranged over the front differential gear 51 serving as the final reduction gear.

As shown in FIG. 2, a piston 52 is fitted slidably between the start clutch drum 13a and the start clutch plates 13c provided to the start clutch 13. When the operating fluid is supplied to a hydraulic chamber 53 that consists of the start clutch drum 13a serving as a cylinder and the piston 52, the piston 52 can be slid to push the start clutch plates 13c. A stopper 54 is provided between the piston 52 and the start clutch hub 13b, and a spring member 55 is fitted between the piston 52 and the stopper 54 in the direction to release the pushing operation of the piston 52. When the hydraulic pressure in the hydraulic chamber 53 is released, the coupling of the start clutch 13 can be released.

Also, a piston 56 is fitted slidably between the start clutch hub 13b serving as a bypass clutch drum and the bypass clutch plates 24c. When the operating fluid is supplied to a hydraulic chamber 57 that consists of the start clutch hub 13b serving as a cylinder and the piston 56, the piston 56 can be slid to push the bypass clutch plates 24c. A stopper 58 is provided between the piston 56 and the bypass clutch hub 24b, and a spring member 59 is fitted between the piston 56 and the stopper 58 in the direction to release the pushing operation of the piston 56. When the hydraulic pressure in the hydraulic chamber 57 is released, the coupling of the bypass clutch 24 can be released.

Figure 3:
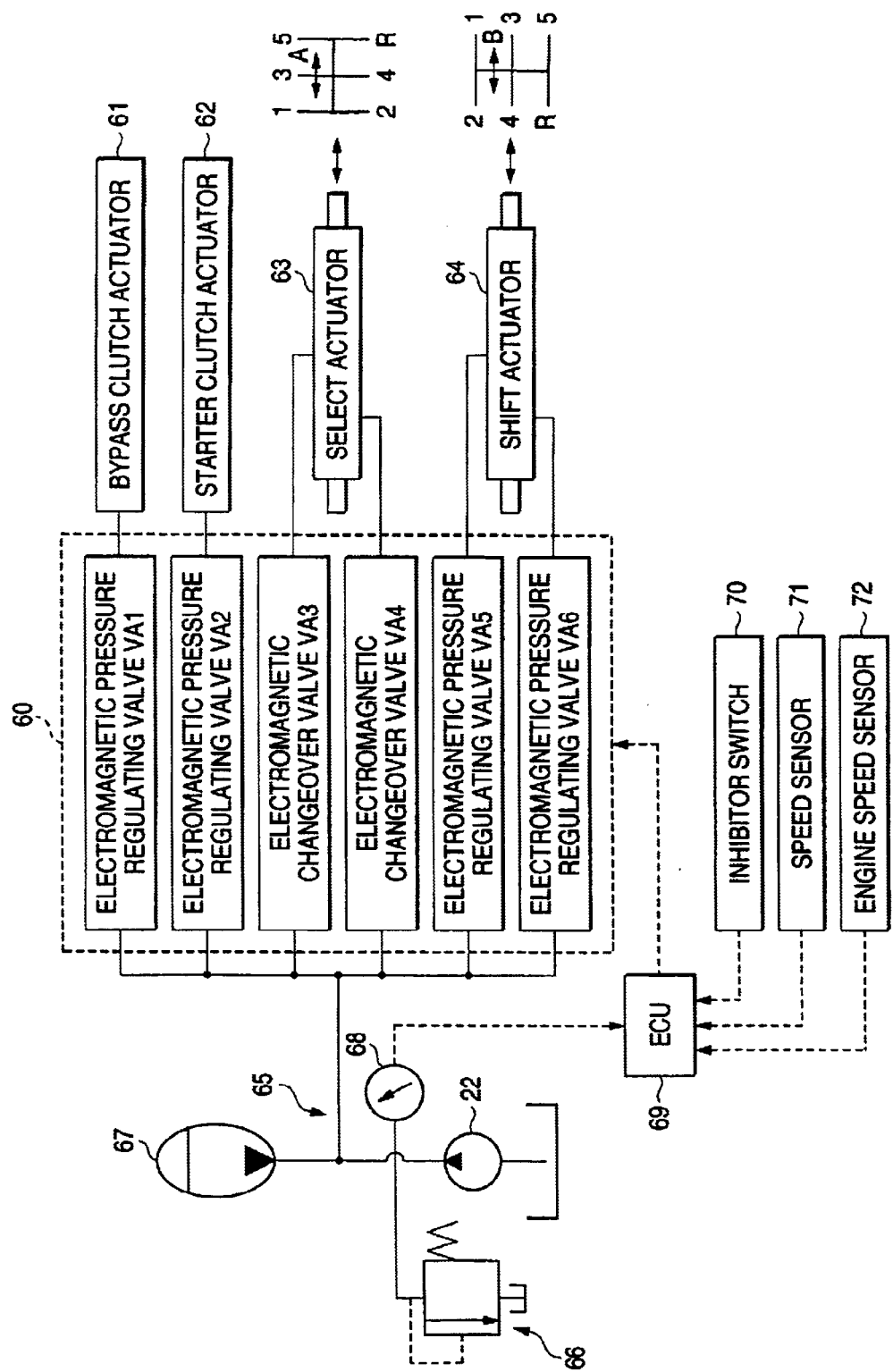
FIG. 3 is a block diagram showing a hydraulic control mechanism of the automatic transmission as the embodiment of the present invention.

The hydraulic control of such automatic transmission will be explained hereunder. FIG. 3 is a block diagram showing a hydraulic control mechanism of the automatic transmission 10 as one embodiment of the present invention. As shown in FIG. 3, the operation of the bypass clutch 24, the operation of the start clutch 13, and the operation of plural changeover mechanisms 41 to 44 are carried out by operating plural electromagnetic valves VA1 to VA6 which are incorporated into a valve unit 69 constituting the hydraulic control mechanism, and supplying/controlling the operating fluid to a bypass clutch actuator 61, a start clutch actuator 62, a select actuator 63, and a shift actuator 64.

The operating fluid used to drive these actuators 61 to 64 is sucked from an oil reservoir provided to the bottom portion of the transmission by the gear type oil pump 22 and then supplied as the operating fluid pressure. A pressure regulating valve 66 is provided to a hydraulic system 65 that supplies the line pressure as the operating fluid pressure. When the line pressure is in excess of a predetermined value, the pressure regulating valve 66 is opened to guide the operating fluid to the oil reservoir. When the line pressure is below the predetermined value after various shifting operations are executed to consume the hydraulic pressure, the pressure regulating valve 66 is closed to increase the line pressure. A part of the operating fluid pressure is accumulated in an accumulator 67, so that the line pressure can be stabilized and also the minimum emergency operation can be executed even if the trouble of the oil pump 22, etc. are caused and troubles occur in the hydraulic system 65. Also, a signal is input from a pressure sensor 68 provided to the hydraulic system 65 to an ECU 69, and thus the line pressure is monitored by the ECU 69.

Signals are input into the ECU 69 from an inhibitor switch 70, a speed sensor 71, an engine speed sensor 72, etc. The ECU 69 senses the position of the select lever selected by the driver based on the signal from the inhibitor switch 70. The ECU 69 also senses the speed based on the signal from the speed sensor 71. Then, the ECU 69 senses the engine speed based on the signal from the engine speed sensor 72. The ECU 69 senses the driving situation of the vehicle based on these sensed data and also outputs the signals to the valve unit 60 to drive/control the actuators 61 to 64 as the case may be.

In this manner, the operating fluid supplied from the oil pump 22 is supplied to the bypass clutch actuator 61 via an electromagnetic pressure regulating valve VA1, and supplied to the start clutch actuator 62 via an electromagnetic pressure regulating valve VA2. In addition, the operating fluid is supplied to the select actuator 63 via an electromagnetic changeover valve VA3. An electromagnetic changeover valve VA4, and the operating fluid is supplied to the shift actuator 64 via an electromagnetic pressure regulating valve VA5 and an electromagnetic pressure regulating valve VA6.

The engagement of the bypass clutch 24 is attained by the bypass clutch actuator 61. When the operating fluid pressure is supplied to the hydraulic chamber 57 of the bypass clutch actuator 61 and thus the piston 56 is slid by the hydraulic pressure, the bypass clutch plates 24c are pushed and thus the driving torque of the input shaft 14 can be transmitted to the output shaft 16.

The engagement of the start clutch 13 is attained by the start clutch actuator 62. When the operating fluid pressure is supplied to the hydraulic chamber 53 of the start clutch actuator 62 and thus the piston 52 is slid by the hydraulic pressure, the start clutch plates 13c are pushed and thus the driving torque of the turbine shaft 23 can be transmitted to the input shaft 14.

The selecting operation for selecting the transmission gear train, which transmits the power, from plural transmission gear trains is carried out by the shift actuator 64 and the select actuator 63. The selecting operation between the shift actuator 64 and the select actuator 63 can be transmitted to four changeover mechanisms 41 to 44 via a direction changing mechanism (not shown).

The selecting operation of the shift actuator 64 is transmitted as the selecting operation of the transmission gear train shown in an arrow B direction in FIG. 3. That is, such selecting operation is given as the operation to switch the transmission gear train into one of the first gear and the second gear, one of the third gear and the fourth gear, or one of the fifth gear and the reverse gear. More particularly, the synchro sleeves 41b to 43b or a changeover member 44b is slid by such selecting operation.

The selecting operation of the select actuator 63 is transmitted as the selecting operation of the transmission gear train shown in an arrow A direction in FIG. 3. That is, such selecting operation is given as the operation to select the object to which the selecting operation of the shift actuator 64 is transmitted. More particularly, such selecting operation decides which one of the synchro sleeves 41b to 43b and the changeover member 44b the selecting operation of the shift actuator 64 should be transmitted to.

When the operation of the shift actuator 64 is transmitted to the first changeover mechanism 41, such shift actuator 64 is operated into a position at which the synchro sleeve 41b is engaged with the spline 31c to set the first gear, a position at which the synchro sleeve 41b is engaged with the spline 32c to set the second gear, or a neutral position at which the synchro sleeve 41b is engaged with these splines 31c, 32c. Similarly, when the operation of the shift actuator 64 is transmitted to the second changeover mechanism 42, such shift actuator 64 is operated into one of three positions, i.e., the third gear, the fourth gear, or the neutral position. In addition, when the operation of the shift actuator 64 is transmitted to the third changeover mechanism 43, such shift actuator 64 is operated into one of two positions, i.e., the fifth gear or the neutral position. Further, when the operation of the shift actuator 64 is transmitted to the fourth changeover mechanism 44, such shift actuator 64 is operated into one of two positions, i.e., the reverse gear or the neutral position.

The reason for that the select actuator 63 is controlled by the electromagnetic changeover valves VA3, VA4 whereas the electromagnetic pressure regulating valves VA5, VA6 are employed to control the shift actuator 64 is the difference in the object operated by the actuator. When the actuator is controlled in the arrow A direction that is the control direction of the select actuator 63, such actuator may be simply controlled into three positions. In contrast, when the actuator is controlled in the arrow B direction that is the control direction of the shift actuator 64, the synchromesh mechanism must be operated. Thus the electromagnetic pressure regulating valves VA5, VA6 that can adjust finely the supplied hydraulic pressure must be employed in place of the ON/OFF control of the hydraulic pressure. Therefore, the shift actuator 64 is controlled strongly at the initial stage of its operation, controlled normally during the sychromesh-synchronization, and controlled weakly at the end stage of its operation.

The hydraulic pressure control mechanism consists of the valve unit 60, the select actuator 63, the shift actuator 64, etc. to execute such hydraulic pressure control. The hydraulic pressure control mechanism is fitted in the range that is positioned at the back of the oil pump 22 shown in FIG. 1, and over the front differential gear 51 as the final reduction gear, and in front of a wall portion 75 formed around the almost center portion of the transmission.

As for the operation control of the torque converter 12 having the lock-up clutch 21, the power of the engine 11 can be transmitted directly to the turbine shaft 23 by supplying the operating fluid pressure to an apply chamber 76 and a release chamber 77 of the lock-up clutch 21 in compliance with an output signal of the ECU 69, otherwise the power of the engine 11 can be transmitted to the turbine shaft 23 via the torque converter 12.

The selecting operation of the transmission gear train in the transmission in FIG. 1 will be explained hereunder. The selecting of the first gear is carried out by engaging the synchro sleeve 41b of the first changeover mechanism 41 with the spline 31c by virtue of operations of the select actuator 63 and the shift actuator 64. At this time, the driving torque of the input shaft 14 is transmitted from the input shaft 14 to the output shaft 16 via the driving gear 31a, the driven gear 31b, and the first changeover mechanism 41. When the synchro sleeve 41b is engaged with the spline 32c, the transmission gear train is switched into the second gear. Similarly the selecting operations from the third gear to the fifth gear can be executed by operating the second changeover mechanism 42 or the third changeover mechanism 43.

When the shifting operation is executed from the first gear to the second gear, such shifting operation is carried out via the neutral position of the first changeover mechanism 41, so that the situation that the driving torque cannot be transmitted temporarily from the input shaft 14 to the output shaft 16 is caused. Normally, when the gear ratio of respective transmission gear trains is decided, the gear ratio is lowered like the geometric series from the first gear to decide such that the revolution range of the engine 11 employed before and after each shift stage is selected to be kept constant. Accordingly, the difference in the gear ratio before and after the selecting is particularly large in the transmission gear train at the low speed stage, and thus the large acceleration change is caused in the vehicle by the shifting operation via the neutral state in contrast to the high speed stage.

Figure 4:
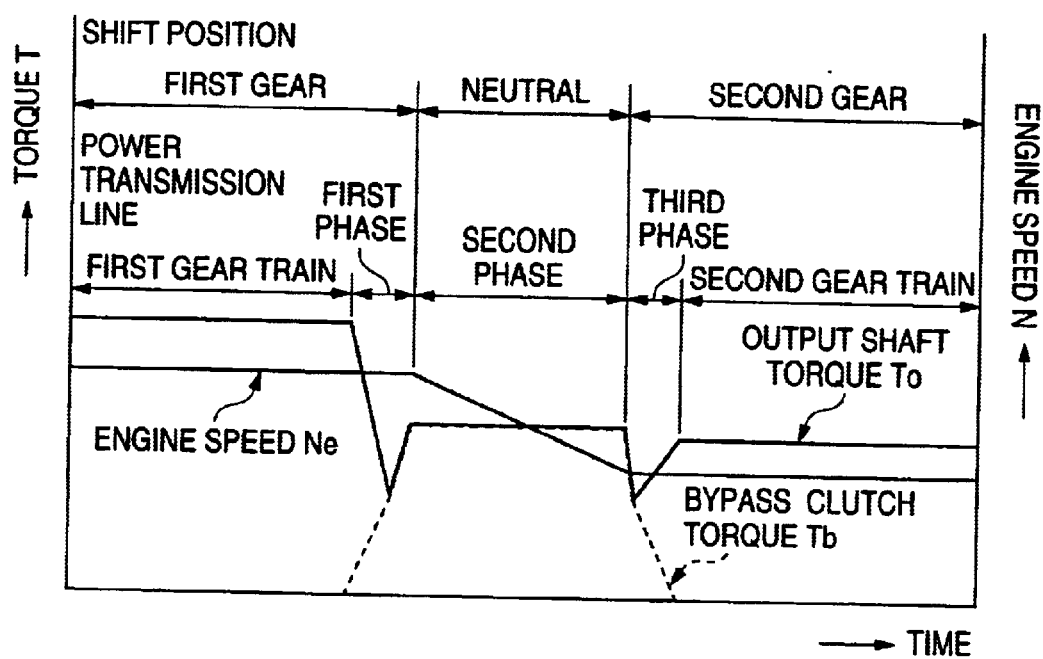
FIG. 4 is a view showing a relationship between an output shaft torque and a bypass clutch torque in the shifting operation.
Figure 5:
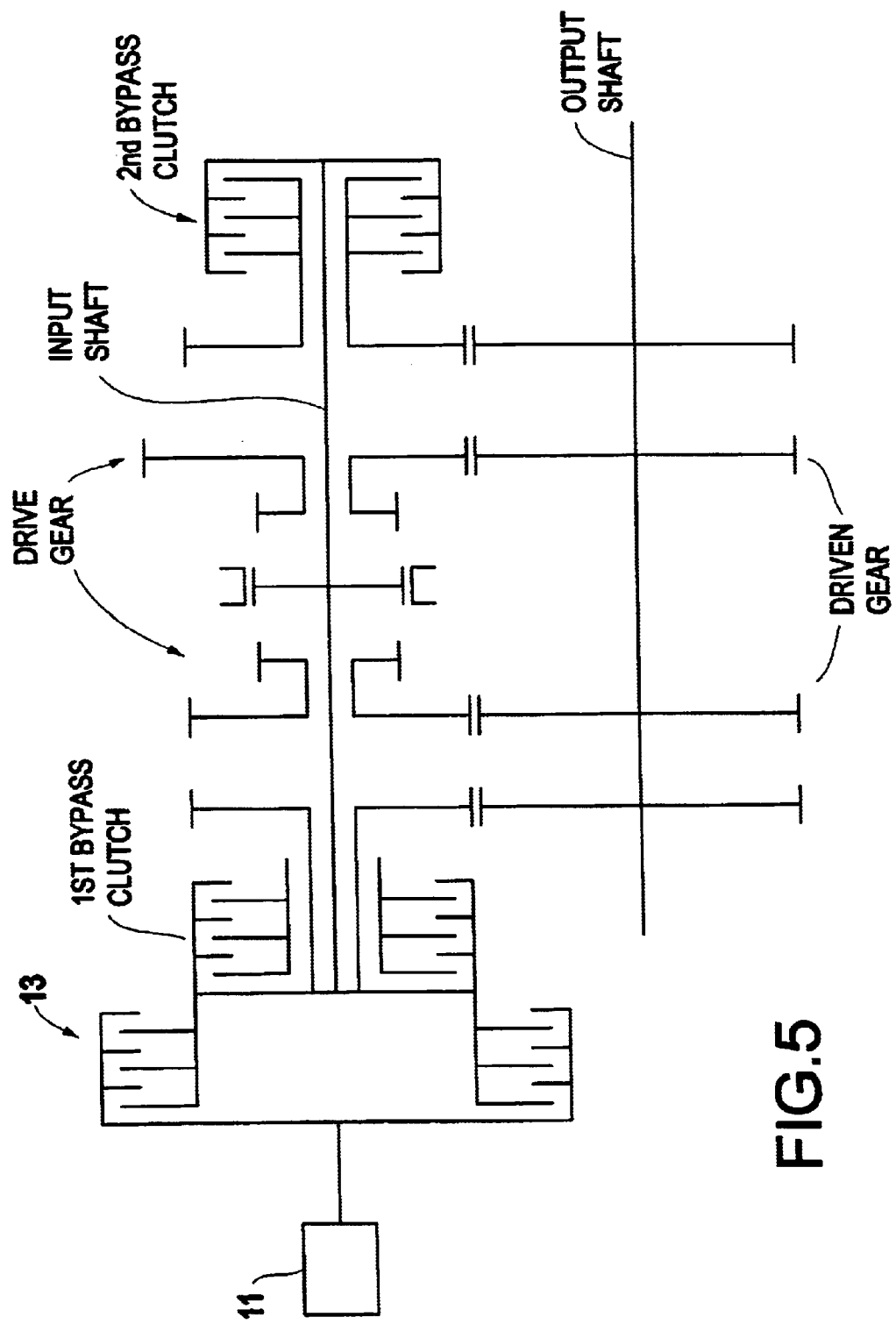
FIG. 5 is a skeleton diagram showing an automatic transmission having an input shaft and an output shaft arranged in a traveling direction of a vehicle and a plurality of bypass clutches of another embodiment of the present invention.

In order to suppress such acceleration change by preventing the torque stop of the output shaft 16 in the neutral state, the driving torque is transmitted to the output shaft 16 while controlling the connection/disconnection of the bypass clutch 24 in synchronism with the selecting operation. FIG. 4 is a view showing a relationship between an output shaft torque To and a bypass clutch torque Tb when the shifting is executed from the first gear to the second gear. As shown in FIG. 4, since the transmission of the output shaft torque To is shut off until the synchro sleeve 41b is separated from the spline 31c and then engaged with the spline 32c, the ECU 69 controls the engagement of the bypass clutch 24 to supplement the output shaft torque To at the same time when the synchro sleeve 41b is separated from the spline 31c. When the synchromesh mechanism starts to operate after the first changeover mechanism 41 is passed through the neutral state and then the generation of the output shaft torque To by the second gear is started, the ECU 69 starts to release the engagement of the bypass clutch 24 and then brings the bypass clutch 24 in its release state at the same time when the synchro sleeve 41b is engaged with the spline 32c.

The bypass clutch 24 provided to the transmission shown in FIG. 1 is one, and is operated in the shifting operation at the low speed range in which the difference in the gear ratio is large. If the bypass clutch that can set the transmission torque to the high speed gear is added to the high speed range in which the difference in the gear ratio is gentle, the smooth shifting operation can be carried out over the full shift range.

In contrast, the selecting of the reverse gear is executed by operating the select actuator 63 and the shift actuator 64 to operate the fourth changeover mechanism 44. Since the fourth changeover mechanism 44 is the slide-selection type changeover mechanism, the torque transmission of the input shaft 14 is cut off by bringing the start clutch 13 into its release state to disconnect the input shaft 14 from the turbine shaft 23 and then such fourth changeover mechanism 44 is operated.

The changeover mechanisms 41 to 43 employed in the forward travel can be controlled into the neutral state in which they are not engaged with the splines 31a to 35a provided on both sides, so that they are controlled to prevent the event that plural changeover mechanisms 31 to 33 are engaged simultaneously in the running. In this case, the changeover mechanism 44 employed in the reverse travel is also controlled to operate only when the changeover mechanisms 41 to 43 are positioned in the neutral state.

According to such automatic transmission 10, since the hydraulic pressure control mechanism consisting of the valve unit 60, the actuators 63, 64, etc. as the basic constituent elements in the automated transmission, the oil pump 22, the start clutch 13, and the bypass clutch 24 are arranged over the front differential gear 51 serving as the final reduction gear. Therefore, the basic constituent elements pursuant to the automated transmission can be installed without the provision of a new space. As a result such a situation can be suppressed that a total length of the automatic transmission 10 in the axial direction becomes longer than the manual transmission that constitutes the basic structure of this automatic transmission 10. Also, since the automatic transmission 10 is constructed to have three shafts of the input shaft 14, the output shaft 16 and the front wheel driving shaft 17, the final reduction gear and the gears can be installed to overlap with each other in the axial direction and thus the transmission can be shortened. In addition, since the valve unit 60 and the oil pump 22 for supplying the operating fluid pressure to the start clutch 13 and the bypass clutch 24 are positioned collectively, the responsibility in control can be improved.

The above embodiment of the present invention is not limited, and it is needless to say that the present invention can be changed variously in the scope not to depart from the gist of the invention. For example, the employment of the bypass clutch 24 is not limited in the shifting operation in the low speed range, and the bypass clutch 24 may be employed in the high speed range. In order to shift smoothly the full shifting gears, plural bypass clutches may be provided and at least one bypass clutch may be provided over the front differential gear 51 serving as the final reduction gear. The illustrated automatic transmission 10 is employed in the longitudinal type four-wheel-drive vehicle, but it may be employed in the two-wheel-drive vehicle. In addition, the illustrated automatic transmission 10 is of the five forward gears/one reverse gear type, but the present invention is not limited to this transmission gear number.

The automatic transmission is constructed to have three shafts of the input shaft, the output shaft, and the driving shaft having the final reduction gear, and also the bypass clutch as the basic constituent element of the automatic transmission is installed over the final reduction gear. Therefore, the automatic transmission can be realized not to extend the axial length rather than the manual transmission as the basic structure.

Since the oil pump can be arranged over the final reduction gear and near the bypass clutch, the hydraulic pressure source and the hydraulic actuator can be positioned closely. Therefore, the responsibility in the hydraulic pressure control can be improved.

What is claimed is:

1. An automated manual transmission comprising:
    an input shaft to which a plurality of driving gears are provided;
    an output shaft to which a plurality of driven gears are provided, the plurality of driven gears being engaged with the driving gears to constitute a plurality of transmission gear trains respectively;
    a changeover mechanism for selecting the desired transmission gear train which transmits a power, out of the plurality of transmission gear trains;
    a start clutch for setting an engine and the input shaft into an engage state and a disengage state;
    a driving shaft coupled to the output shaft in parallel with the output shaft, the driving shaft being coupled to a final reduction gear; and
    a bypass clutch arranged over the final reduction gear and transmitting a torque of the input shaft to the output shaft while controlling connection and disconnection in synchronism with a selecting operation of the transmission gear trains in a shifting operation.

2. The automated manual transmission according to claim 1, wherein the bypass clutch comprises a plurality of bypass clutches provided between the input shaft and the output shaft.

3. The automated manual transmission according to claim 2, further comprising:
    an oil pump driven by the engine to generate a hydraulic pressure which drives the start clutch and the bypass clutch, wherein the oil pump is arranged over the final reduction gear and near the bypass clutch.

4. The automated manual transmission of claim 2, wherein at least one of the plurality of bypass clutches is arranged over the final reduction gear.

5. The automated manual transmission of claim 2, wherein the driving shaft is arranged below the output shaft.

6. The automated manual transmission according to claim 1, further comprising:
    an oil pump driven by the engine.

7. The automated manual transmission of claim 6, wherein the oil pump is arranged over the final reduction gear and near the bypass clutch.

8. The automated manual transmission of claim 6, wherein the oil pump drives the start clutch.

9. The automated manual transmission of claim 6, wherein the oil pump drives the bypass clutch.

10. The automated manual transmission of claim 1, wherein the start clutch for setting an engine and the input shaft into an engage state and a disengage state operates through a torque converter between said engine and said start clutch.

11. The automated manual transmission of claim 1, wherein the automatic transmission is arranged longitudinally in an engine room in which the input shaft and the output shaft are arranged in a traveling direction of a vehicle.

12. An automated manual transmission comprising:

a torque converter that selectively engages an engine to a turbine shaft;

a start up clutch that selectively engages the turbine shaft to an input shaft having a plurality of driving gears;

an output shaft having a plurality of driven gears, wherein the plurality of driven gears engage the driving gears to comprise a plurality of transmission gear trains;

a changeover mechanism that selects one of the plurality of transmission gear trains;

a driving shaft coupled to the output shaft in parallel with the output shaft;

a final reduction gear coupled to the driving shaft; and a bypass clutch over the final reduction gear.

13. The transmission of claim 12, wherein said bypass clutch selectively engages said input shaft to said output shaft.

14. The transmission of claim 13, wherein said bypass clutch selectively engages said input shaft to said output shaft using a bypass driving gear and a bypass driven gear.

15. The transmission of claim 12, further comprising an oil pump positioned over the final reduction gear.

16. The transmission of claim 12, wherein said transmission is arranged longitudinally in a vehicle.

17. The transmission of claim 12, further comprising a center differential and another driving shaft, wherein said center differential couples said output shaft to said driving shaft and said another driving shaft.

18. The transmission of claim 12, further comprising a plurality of bypass clutches that each selectively engage said input shaft to said output shaft.

19. The transmission of claim 12, further comprising a control system that controls said changeover mechanism and said bypass clutch.

20. The transmission of claim 19, wherein said control system controls said bypass clutch to engage said input shaft to said output shaft while controlling said changeover mechanism during a switch between the plurality of gear trains.

21. The transmission of claim 20, wherein said control system controls said bypass clutch and said changeover mechanism to continuously provide torque from said input shaft to said output shaft during a switch between the plurality of gear trains.

* * * * *